United States Patent
Hongo

(10) Patent No.: US 12,429,847 B2
(45) Date of Patent: Sep. 30, 2025

(54) FEED AXIS MONITORING DEVICE AND MONITORING METHOD FOR MACHINE TOOL

(71) Applicant: OKUMA CORPORATION, Niwa-Gun (JP)

(72) Inventor: Takumi Hongo, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 386 days.

(21) Appl. No.: 18/307,063

(22) Filed: Apr. 26, 2023

(65) Prior Publication Data

US 2023/0376003 A1    Nov. 23, 2023

(30) Foreign Application Priority Data

May 17, 2022   (JP) ................................. 2022-081064

(51) Int. Cl.
| | |
|---|---|
| *G05B 19/4065* | (2006.01) |
| *B23Q 15/013* | (2006.01) |
| *B23Q 17/09* | (2006.01) |
| *G05B 19/402* | (2006.01) |

(52) U.S. Cl.
CPC ....... *G05B 19/4065* (2013.01); *B23Q 15/013* (2013.01); *B23Q 17/0952* (2013.01); *G05B 19/402* (2013.01)

(58) Field of Classification Search
None
See application file for complete search history.

(56) References Cited

U.S. PATENT DOCUMENTS

| | | | |
|---|---|---|---|
| 2020/0026255 A1* | 1/2020 | Isobe | G05B 19/406 |
| 2021/0101241 A1* | 4/2021 | Hongo | B23Q 15/12 |

FOREIGN PATENT DOCUMENTS

| | | |
|---|---|---|
| JP | 2000-250625 A | 9/2000 |
| JP | 2018-073327 A | 5/2018 |

* cited by examiner

*Primary Examiner* — Ryan A Jarrett
(74) *Attorney, Agent, or Firm* — BURR PATENT LAW, PLLC

(57) ABSTRACT

A feed axis monitoring device includes a position deviation calculating unit, a machined surface perpendicular direction calculating unit, a position deviation component converting unit, a threshold value calculating unit, and an abnormality determining unit. The position deviation calculating unit calculates a position deviation of the feed axis. The machined surface perpendicular direction calculating unit calculates a direction perpendicular to a machined surface at a time of a position deviation calculation. The position deviation component converting unit converts a position deviation of the feed axis into a component in the perpendicular direction. The threshold value calculating unit calculates a threshold value based on a preset relation between an operating state of the main spindle and the threshold value. The abnormality determining unit determines that the feed axis has an abnormality when the position deviation exceeds the threshold value.

2 Claims, 2 Drawing Sheets

FEED AXIS MONITORING DEVICE AND MONITORING METHOD FOR MACHINE TOOL

CROSS REFERENCE TO RELATED APPLICATION

This application claims the benefit of Japanese Patent Application Number 2022-081064 filed on May 17, 2022, the entirety of which is incorporated by reference.

FIELD OF THE INVENTION

The disclosure relates to a feed axis monitoring device and a monitoring method for a machine tool for determining an abnormality of a feed axis that adversely affects a machined surface property in a machine tool that performs machining of a workpiece while rotating a tool mounted to a main spindle or the workpiece.

BACKGROUND OF THE INVENTION

For recent feed axes of a machine tool, a method that transmits a rotational motion of a motor to a ball screw for driving to allow moving along a rolling guide device has often been used. When aged deterioration, contamination with foreign matter, poor lubrication, or the like occurs in a driving part, such as the ball screw and the rolling guide mechanism, the feed axes fall into a state of not normally operating. As a result, a machining defect, such as a poor shape of the machined object and a poor machined surface property, occurs, adversely affecting production. Accordingly, to achieve the stable production in the operation of the machine tool, it has been required to detect an abnormality in a machine and notify a manager and a worker of the state of the machine to avoid a machining failure of a workpiece in advance, and methods that perform various diagnoses have been proposed.

For example, JP 2000-250625 A discloses a failure diagnostic device. The failure diagnostic device uses a detecting unit of a driving power value usually disposed in a machine having a drive unit, stores a normal driving power value of an actuator that is preliminarily measured in a storage unit, compares a detected driving power value with the normal driving power value, and determine that a power system has a failure when the difference is equal to or more than a threshold value. The failure diagnostic device compares a detected driving power value with the stored normal driving power value to determine a heavy failure when the difference is equal to or more than a certain threshold value and determine a light failure when the difference is equal to or more than a relatively small threshold value.

In addition, JP 2018-73327 A discloses a machine diagnostic system. The machine diagnostic system has a unit to calculate evaluation data, such as backlash, position deviation, the amplitude of driving force, and velocity deviation from data measured by driving a drive unit of a machine tool in a predetermined pattern. The machine diagnostic system compares the calculated evaluation data with evaluation data stored in association with an execution date and time, and issues a warning when a predetermined change is detected in the evaluation data.

However, in a machine tool that machines various workpieces depending on users, for a minor abnormality that does not cause the drive unit to be inoperative within a short period when it is left, a determination criterion of the abnormality may differ depending on the workpiece machined by a user.

Operation influences exerted when a feed axis of a machine tool deteriorates include an increased change in position deviation during an axis operation, which adversely affects a machined surface grade and a machined shape. However, since the degree of influence differs depending on the machined workpiece and machining operation, the operating state of the feed axis that should be regarded as abnormal differs. For example, in parts machining, it is less likely to be affected by a feed axis deterioration for the reasons that a direction of variation in feed axis operation is parallel to a machined surface in many cases and that an acceleration/deceleration unit where a variation is easily generated is not on the machined surface in many cases. Meanwhile, in die machining, it is likely to be affected by the feed axis deterioration because of a free curved surface. Therefore, when a threshold value based on the die machining is used to detect a minor abnormality and a precursory stage of an abnormality and replace a part, a user that performs parts machining may end up replacing a part even though the part is still at a stage where it can be used without obstacles.

Therefore, in consideration of the issue, it is an object of the disclosure to provide a feed axis monitoring device and a monitoring method for a machine tool that ensures appropriately determining an abnormality of a feed axis that adversely affects a machined surface property.

SUMMARY OF THE INVENTION

In order to achieve the above-described object, a first configuration of the disclosure is a feed axis monitoring device for a machine tool. The feed axis monitoring device determines an abnormality of a feed axis in the machine tool performing machining of a workpiece while rotating a tool mounted to a main spindle or the workpiece and driving a moving body by the feed axis. The feed axis monitoring device includes a position deviation calculating unit, a machined surface perpendicular direction calculating unit, a position deviation component converting unit, a threshold value calculating unit, and an abnormality determining unit. The position deviation calculating unit calculates a position deviation of the feed axis. The machined surface perpendicular direction calculating unit calculates a direction perpendicular to a machined surface at a time of a position deviation calculation. The position deviation component converting unit converts the position deviation of the feed axis into a component in the perpendicular direction. The threshold value calculating unit calculates a threshold value based on a preset relation between an operating state of the main spindle and the threshold value. The operating state of the main spindle is at least one of an absolute value or a variation amount per unit time of a load of the main spindle at the time of the position deviation calculation. The abnormality determining unit compares the position deviation of the feed axis converted into the component in the perpendicular direction by the position deviation component converting unit with the threshold value calculated by the threshold value calculating unit and determines that the feed axis has an abnormality when the position deviation exceeds the threshold value.

In order to achieve the above-described object, a second configuration of the disclosure is a feed axis monitoring method for a machine tool. The feed axis monitoring method determines an abnormality of a feed axis in the machine tool performing machining of a workpiece while rotating a tool mounted to a main spindle or the workpiece and driving a moving body by the feed axis. The feed axis monitoring method includes: calculating a position deviation of the feed axis; calculating a direction perpendicular to a machined surface at a time of a position deviation calculation; converting the position deviation of the feed axis into a component in the perpendicular direction; calculating a threshold value based on a preset relation between an operating state of the main spindle and the threshold value, the operating state of the main spindle being at least one of an absolute value or a variation amount per unit time of a load of the main spindle at the time of the position deviation calculation; and comparing the position deviation of the feed axis converted into the component in the perpendicular direction in the converting of the position deviation with the threshold value calculated in the calculating of the threshold value and determining that the feed axis has an abnormality when the position deviation exceeds the threshold value.

With the disclosure, the threshold value is calculated based on the preset relation between the operating state of the main spindle and the threshold value, and the position deviation of the feed axis that has been converted into the component in the perpendicular direction is compared with the calculated threshold value to determine an abnormality of the feed axis. Therefore, an abnormality of the feed axis that adversely affects a machined surface property according to a machining operation can be appropriately determined. Accordingly, a situation in which a part still usable without obstacles ends up being replaced due to a minor abnormality or at a precursory stage of an abnormality is less likely to happen.

DETAILED DESCRIPTION OF THE INVENTION

The following describes an embodiment of the disclosure based on the drawings.

Figure 1:
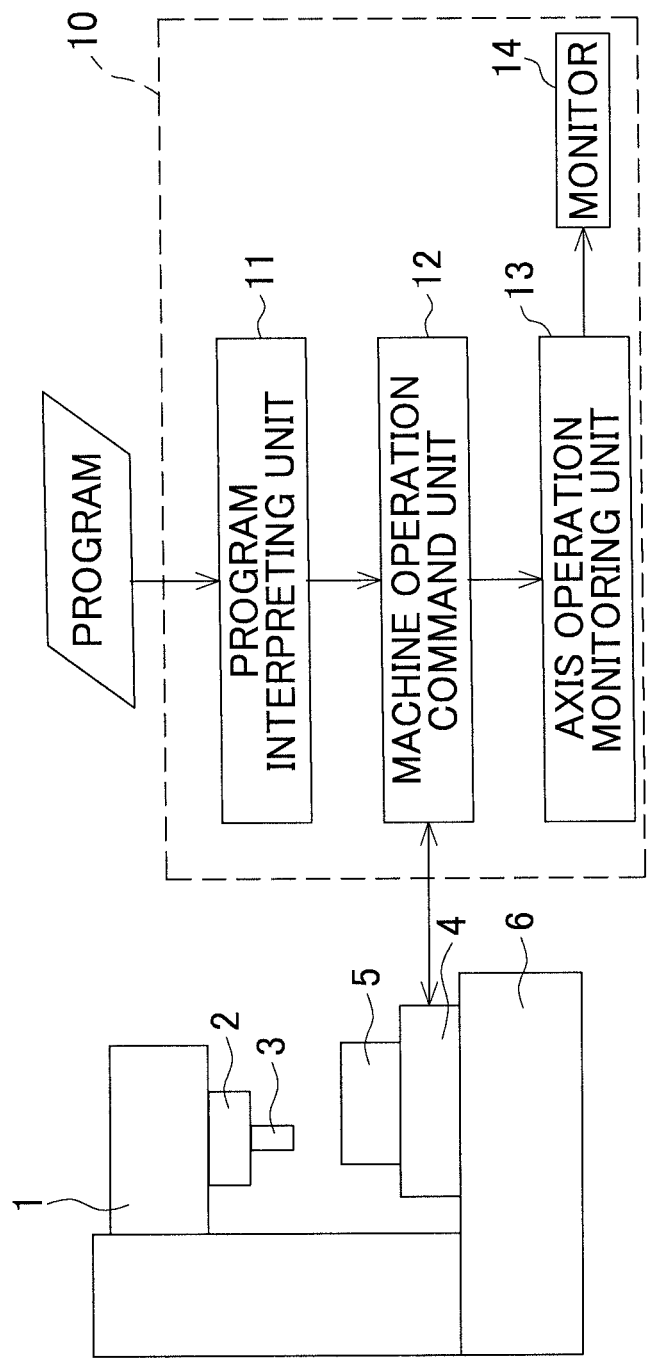
FIG. 1 is a block configuration diagram of a machine tool and a feed axis monitoring device.

FIG. 1 is a block configuration diagram illustrating an example of a machine tool and a feed axis monitoring device according to a first configuration of the disclosure. A main spindle housing 1 of the machine tool includes a main spindle 2 rotatable by a spindle motor, and a tool 3 is mounted to the distal end of the main spindle 2. The main spindle housing 1 as a moving body is movable in a Z-axis direction. A workpiece 5 is secured on a table 4 as a moving body, and the table 4 is movable on a bed 6 in mutually orthogonal X-axis direction and Y-axis direction. Here, the tool 3 and the workpiece 5 are relatively moved to perform machining of the workpiece 5.

An NC device 10 that controls the machine tool includes a program interpreting unit 11 and a machine operation command unit 12. The program interpreting unit 11 interprets a program input by an operator through an input unit (not illustrated) as a main spindle rotation command and a feed axis operation command. The machine operation command unit 12 controls the spindle motor, each of feed axis motors, and the like based on the command sent from the program interpreting unit 11. Machining of the workpiece 5 is performed by the control of the machine operation command unit 12. The NC device 10 includes a central processing unit (CPU) and a memory connected to the CPU and ensures the operations.

The NC device 10, which is also a feed axis monitoring device, further includes an axis operation monitoring unit 13 and a monitor 14. The axis operation monitoring unit 13 monitors and analyzes information on controls of the main spindle 2 and respective feed axes, such as the X-axis, the Y-axis, and the Z-axis, generated by the machine operation command unit 12. Then, when it is determined that there is an abnormal operation in a feed axis, a process, such as displaying an abnormality detection on the monitor 14, is performed.

The axis operation monitoring unit 13 functions as a position deviation calculating unit, a machined surface perpendicular direction calculating unit, a position deviation component converting unit, a threshold value calculating unit, and an abnormality determining unit of the disclosure.

Figure 2:
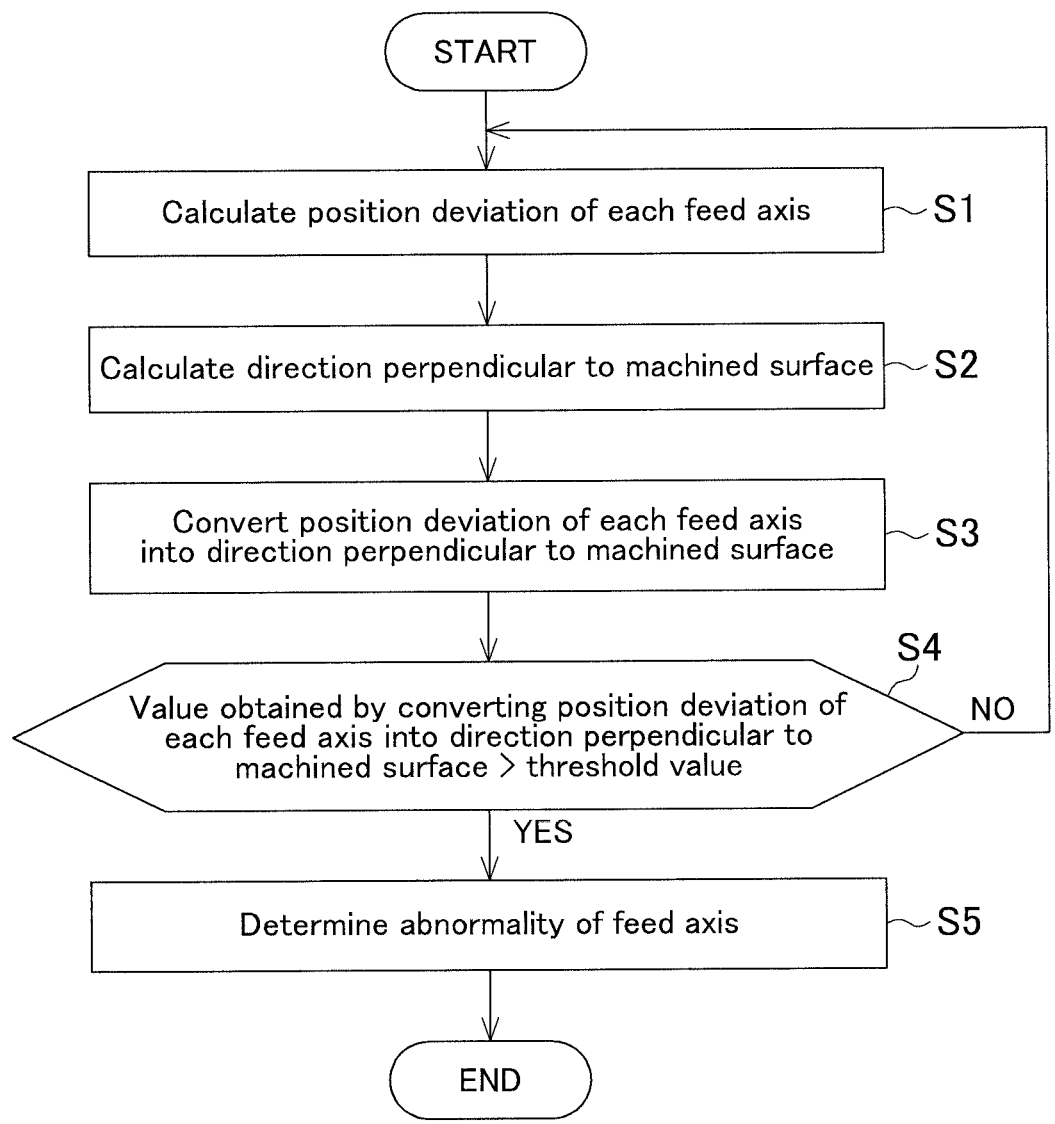
FIG. 2 is a flowchart of a feed axis monitoring method.

Next, a feed axis monitoring method by the axis operation monitoring unit 13 according to a second configuration of the disclosure will be described based on the flowchart of FIG. 2.

First, a position deviation that is a difference between a command value and a current position of each feed axis is calculated (S1: position deviation calculating step). The calculation is processed for all the feed axes that constitute a machine tool when any axis of the feed axes that constitute the machine tool is operating for cutting feed. The position deviation calculated here is the amount of variation in position deviation per unit time as an element strongly affecting a machined surface property. For setting the unit time, the longer one of influenced time periods by a variation per rotation of the feed axis or a vibration generated by an influence of acceleration and deceleration is set such that the variation and the vibration can be detected. In addition, the time at which the position deviation per unit time becomes the largest in absolute value is used as a time point, at which the position deviation has been calculated, in the next step. When the absolute value of the position deviation is used as the element strongly affecting a machined surface property, the influence on a machined shape becomes stronger. Therefore, as described below, a threshold value different from the threshold value for the amount of variation in position deviation per unit time needs to be set.

Next, directions perpendicular to a machined surface with respect to machine coordinates at the time point at which the position deviation has been calculated are calculated (S2: machined surface perpendicular direction calculating step). For example, in the machine tool having a configuration illustrated in FIG. 1, when the directions perpendicular to the machined surface are calculated only from the coordinate information of a machining program, they are calculated as follows.

When only one axis is operating, the directions perpendicular to the machined surface are the directions of the axes that are not operating.

$(X,Y,Z)=(0,0,0) \rightarrow (X,Y,Z)=(100,0,0)=$    Operating State 1

$\Rightarrow$ The directions perpendicular to the machined surface: Y0 degrees, Z0 degrees When two axes are operating, the directions perpendicular to the machined surface are the direction of the axis that is not operating and a direction perpendicular to a moving direction moving in the coordinate plane of the operating axes.

$(X,Y,Z)=(0,0,0) \rightarrow (X,Y,Z)=(100,100,0)=$    Operating State 2

=> The directions perpendicular to the machined surface: Z0 degree, XY plane 135 degrees In addition, when a material shape and a tool shape are registered in the NC device 10, the directions perpendicular to the machined surface can be obtained by simulating a machined shape at the time of the machining program execution.

Next, the position deviation of each feed axis is converted into a component in the direction perpendicular to the machined surface (S3: position deviation component converting step). The conversion is performed based on a direction of 0 degrees that becomes a direction of the position deviation of each feed axis. A case where the position deviation of the X-axis is 5 µm is described as an example. For example, in Operating State 1, the position deviation in the direction of Y0 degrees becomes 0, and the position deviation in the direction of Z0 degrees becomes 0. In Operating State 2, the position deviation in the direction of Z0 degrees is 0, and the calculated value of the position deviation in the direction of the XY plane 135 degrees is 3.5 µm (|5×cos 135|).

Next, the value obtained by converting the position deviation of each feed axis into the direction perpendicular to the machined surface is compared with a threshold value preset in a storage unit (not illustrated) (S4). When the converted value exceeds the threshold value, the feed axis is determined to have an abnormality (S5), which is displayed on the monitor 14. S4 and S5 are an abnormality determining step.

Since the position deviation is affected by a machining load, the position deviation should be allowed in machining with a large machining load, such as rough machining, in some cases. Therefore, it is desired to set the threshold value according to the machining load. The disclosure includes a configuration in which the threshold value is variable according to an operating state of the main spindle at the time of the position deviation calculation. The following are two examples of a method of determining the operating state of the main spindle 2 and a method of calculating the threshold value (threshold value calculating step).

In the first example, an absolute value per unit time of a load of a main spindle is used. For the unit time, a time period for one main spindle rotation is set to be the minimum unit time. However, it may be set so as to obtain a state for multiple rotations. First, the absolute value per unit time of the load of the main spindle during idling when machining is not performed is calculated and recorded in advance. In addition, a relation between: a difference in absolute value per unit time of the load of the main spindle between during idling and at the time of the position deviation calculation; and the threshold value is set in advance.

Then, the difference from the absolute value per unit time of the load of the main spindle at the time of the position deviation calculation is calculated, and a threshold value used for monitoring is set based on the preset relation between the difference and the threshold value. For the relation between the difference and the threshold value, the position deviation of each feed axis at the time of the machining, which becomes a predetermined difference, may be measured in advance to create a table and a function.

In the second example, a variation amount per unit time of the load of the main spindle is used. For the unit time, a time period for one main spindle rotation is set to be the minimum unit time. However, it may be set so as to obtain a state for multiple rotations. In this case as well, a relation between the variation amount per unit time of the load of the main spindle at the time of the position deviation calculation and the threshold value is set in advance, and based on the relation, a threshold value used for monitoring is set. Similarly to the first example, the relation between the variation amount and the threshold value may be calculated from an experiment conducted in advance. In addition, a load applied on the feed axis may be calculated from the variation amount per unit time of the load of the main spindle, a tool diameter, and a machining direction, and the load and the rigidity of the feed axis may be used to obtain an acceptable value of the amount of variation in position deviation. For example, for machining to the XY direction, the loads applied on the feed axes are the values obtained by multiplying the variation amount and the tool diameter as they are with respect to the X-axis and the Y-axis. The value obtained by combining the reference threshold value and the acceptable value of the amount of variation in position deviation calculated by the above-described method becomes the threshold value used for monitoring. However, since no load is applied on the feed axis with respect to the Z-axis, the reference threshold value is used.

For setting the above-described respective threshold values, an interface that can adjust the threshold values may be provided according to the machined surface grade required by a user.

Thus, the feed axis monitoring device and the monitoring method for a machine tool of the above-described embodiment calculate the position deviations of the feed axes, calculate the directions perpendicular to the machined surface at a time of the position deviation calculation, and convert the position deviations of the feed axes into the components in the perpendicular directions. The feed axis monitoring device and the monitoring method then calculate the threshold value based on the preset relation between the operating state of the main spindle 2 and the threshold value using the absolute value or the variation amount per unit time of the load of the main spindle 2 at the time of the position deviation calculation as the operating state of the main spindle 2. Then, the feed axis monitoring device and the monitoring method compare the position deviations of the feed axes that have been converted into the components in the perpendicular directions with the calculated threshold value to determine that a feed axis has an abnormality when a position deviation exceeds the threshold value.

With the configuration, an abnormality of the feed axis that adversely affects the machined surface property can be appropriately determined. Accordingly, a situation in which a part still usable without obstacles ends up being replaced due to a minor abnormality or at a precursory stage of an abnormality is less likely to happen.

As the direction perpendicular to the machined surface, a direction perpendicular to a surface specified by a tangential direction can be employed as long as the machined surface is a curved surface or a spherical surface.

In the above-described embodiment, while the absolute value or the variation amount per unit time of the load of the main spindle is used as the operating state of the main spindle, both the absolute value and the variation amount may be used to set the threshold value.

In the above-described embodiment, when an abnormality of a feed axis is determined, it is displayed on the monitor. However, another notification unit, such as an audio or a lamp, may be employed. Together with the notification, the feed axis operation may be stopped.

In the above-described embodiment, while the feed axis monitoring device is disposed in the NC device, the monitoring device of the feed axes may be installed separately from the NC device.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A feed axis monitoring device for a machine tool that determines an abnormality of a feed axis in the machine tool performing machining of a workpiece while rotating a tool mounted to a main spindle or the workpiece and driving a moving body by the feed axis, the feed axis monitoring device comprising:
   a position deviation calculating unit that calculates a position deviation of the feed axis;
   a machined surface perpendicular direction calculating unit that calculates a direction perpendicular to a machined surface at a time of a position deviation calculation;
   a position deviation component converting unit that converts the position deviation of the feed axis into a component in the perpendicular direction;
   a threshold value calculating unit that calculates a threshold value based on a preset relation between an operating state of the main spindle and the threshold value, the operating state of the main spindle being at least one of an absolute value or a variation amount per unit time of a load of the main spindle at the time of the position deviation calculation; and
   an abnormality determining unit that compares the position deviation of the feed axis converted into the component in the perpendicular direction by the position deviation component converting unit with the threshold value calculated by the threshold value calculating unit and determines that the feed axis has an abnormality when the position deviation exceeds the threshold value.

2. A feed axis monitoring method for a machine tool that determines an abnormality of a feed axis in the machine tool performing machining of a workpiece while rotating a tool mounted to a main spindle or the workpiece and driving a moving body by the feed axis, the feed axis monitoring method comprising:
   calculating a position deviation of the feed axis;
   calculating a direction perpendicular to a machined surface at a time of a position deviation calculation;
   converting the position deviation of the feed axis into a component in the perpendicular direction;
   calculating a threshold value based on a preset relation between an operating state of the main spindle and the threshold value, the operating state of the main spindle being at least one of an absolute value or a variation amount per unit time of a load of the main spindle at the time of the position deviation calculation; and
   comparing the position deviation of the feed axis converted into the component in the perpendicular direction in the converting of the position deviation with the threshold value calculated in the calculating of the threshold value and determining that the feed axis has an abnormality when the position deviation exceeds the threshold value.

* * * * *